US010664088B2

(12) United States Patent
Kim

(10) Patent No.: US 10,664,088 B2
(45) Date of Patent: May 26, 2020

(54) METHOD FOR CONTROLLING TOUCH SCREEN AND ELECTRONIC DEVICE SUPPORTING THEREOF

(71) Applicant: Samsung Electronics Co., Ltd., Suwon-si, Gyeonggi-do (KR)

(72) Inventor: Ki Won Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 15/014,666

(22) Filed: Feb. 3, 2016

(65) Prior Publication Data

US 2016/0224180 A1 Aug. 4, 2016

(30) Foreign Application Priority Data

Feb. 3, 2015 (KR) .......................... 10-2015-0016934

(51) Int. Cl.
*G06F 3/041* (2006.01)
(52) U.S. Cl.
CPC ................................. *G06F 3/0416* (2013.01)
(58) Field of Classification Search
CPC combination set(s) only.
See application file for complete search history.

(56) References Cited

U.S. PATENT DOCUMENTS

| 9,069,463 | B2 | 6/2015 | Chang et al. |
| 9,116,696 | B2 | 8/2015 | Tokutake |
| 2012/0105357 | A1 | 5/2012 | Li et al. |
| 2012/0268378 | A1 | 10/2012 | Tokutake |
| 2013/0162550 | A1* | 6/2013 | Chen ..................... G06F 1/3262 |
| | | | 345/173 |
| 2014/0022190 | A1 | 1/2014 | Tokutake |
| 2014/0285447 | A1* | 9/2014 | Chang .................. G06F 3/0418 |
| | | | 345/173 |
| 2014/0306903 | A1 | 10/2014 | Huang et al. |
| 2015/0054767 | A1 | 2/2015 | Lim et al. |
| 2016/0011643 | A1 | 1/2016 | Tokutake |

FOREIGN PATENT DOCUMENTS

| CN | 104063083 A | 9/2014 |
| KR | 10-2015-0022202 A | 3/2015 |

OTHER PUBLICATIONS

Chinese Office Action dated Dec. 18, 2019, issued in Chinese Patent Application No. 201680003659.X.

* cited by examiner

*Primary Examiner* — Robin J Mishler
(74) *Attorney, Agent, or Firm* — Jefferson IP Law, LLP

(57) ABSTRACT

A method for controlling a touch screen is provided. The method includes detecting a touch input by an external object through the touch screen; monitoring the touch input; changing a touch report rate from a first frequency to a second frequency; and reporting information of the touch input to a processor at the touch report rate while the touch input is maintained.

6 Claims, 10 Drawing Sheets

METHOD FOR CONTROLLING TOUCH SCREEN AND ELECTRONIC DEVICE SUPPORTING THEREOF

CROSS-REFERENCE TO RELATED APPLICATION(S)

This application claims the benefit under 35 U.S.C. § 119(a) of a Korean patent application filed on Feb. 3, 2015 in the Korean Intellectual Property Office and assigned Serial number 10-2015-0016934, the entire disclosure of which is hereby incorporated by reference.

TECHNICAL FIELD

The present disclosure relates to a method for controlling a touch screen and an electronic device supporting the same.

BACKGROUND

As touch screens are used as input means of electronic devices, user experience (UX) and a user interface, which correspond to an interaction between an electronic devices and a user, are becoming more important.

An electronic device provided with a touch screen may recognize a touch input from a user and then perform a process corresponding to the touch input. If a specific portion of the touch screen is touched, the electronic device may detect coordinates of the specific portion and then perform a predetermined operation defined for an item displayed at the coordinates.

Touch responsiveness, which is the ability of a touch screen to sense a touch input and respond to the touch input, is affected by a touch report rate of the touch screen. If the touch report rate is too low, the touch responsiveness may decrease. On the contrary, if the touch report rate is too high, current consumption may increase.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for controlling a touch screen which enables reduction of power consumption and an electronic device supporting the same.

In accordance with an aspect of the present disclosure, an electronic device is provided. The electronic device includes a processor, and a touch screen configured to detect a touch input by an external object, monitor the touch input, change a touch report rate from a first frequency to a second frequency based on a result of monitoring the touch input, and report information of the touch input to the processor at the touch report while the touch input is maintained.

In accordance with another aspect of the present disclosure, a method for controlling a touch screen is provided. The method includes detecting a touch input by an external object through the touch screen, monitoring the touch input, changing a touch report rate from a first frequency to a second frequency based on a result of monitoring the touch input, and reporting information of the touch input to a processor electronically connected to the touch screen at the touch report rate while the touch input is maintained.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
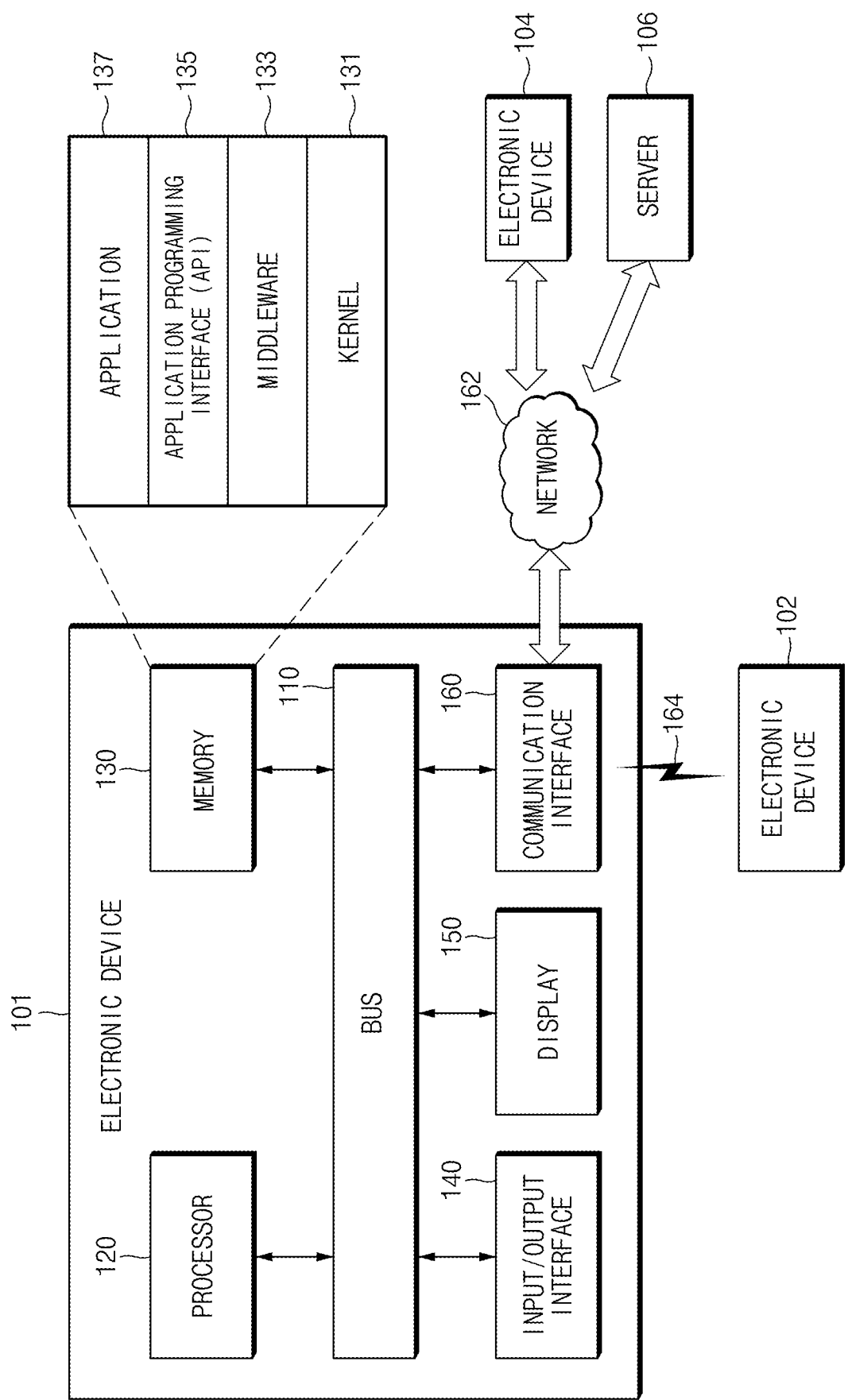
FIG. 1 illustrates an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "have", "may have", "include", "may include", "comprise", or the like used herein indicates the existence of a corresponding feature (e.g., a number, a function, an operation, or an element) and does not exclude the existence of an additional feature.

The term "A or B", "at least one of A and/or B", or "one or more of A and/or B" may include all possible combinations of items listed together. For example, the term "A or B", "at least one of A and B", or "at least one of A or B" may indicate all the cases of (1) including at least one A, (2) including at least one B, and (3) including at least one A and at least one B.

The term "first", "second" or the like used herein may modify various elements regardless of the order and/or priority thereof, but does not limit the elements. For example, "a first user device" and "a second user device" may indicate different user devices regardless of the order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" may be interchangeably used with the term, for example, "suitable for", "having the capacity to", "designed to", "adapted to", "made to", or "capable of" The term "configured (or set) to" may not necessarily have the meaning of "specifically designed to." In some cases, the term "device configured to" may indicate that the device "may perform" together with other devices or components. For example, the term "processor configured (or set) to perform A, B, and C" may represent a dedicated processor (e.g., an embedded processor) for performing a corresponding operation, or a generic-purpose processor (e.g., a central processing unit (CPU) or an application processor (AP)) for executing at least one software program stored in a memory device to perform a corresponding operation.

The terms used herein, including technical or scientific terms, have the same meanings as understood by those skilled in the art. Commonly-used terms defined in a dictionary may be interpreted as having meanings that are the same as or similar to contextual meanings defined in the related art, and should not be interpreted in an idealized or overly formal sense unless otherwise defined explicitly. Depending on the case, terms defined herein should not be such interpreted as to exclude various embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group phase 1 or phase 2 (MPEG-1 or MPEG-2) Audio Layer 3 (MP3) player, a mobile medical device, a camera, or a wearable device (e.g., smart glasses, a head-mounted device (HMD), an electronic apparel, an electronic bracelet, an electronic necklace, an electronic appcessory, an electronic tattoo, a smart mirror, or a smartwatch).

In various embodiments of the present disclosure, an electronic device may be a smart home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global positioning system (GPS) receiver, an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller's machine (ATM), a point of sales (POS) of a store, or an Internet of things device (e.g., a bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). In various embodiments of the present disclosure, an electronic device may be one or more combinations of the above-mentioned devices. An electronic device according to various embodiments of the present disclosure may be a flexible device. An electronic device according to an embodiment of the present disclosure is not limited to the above-mentioned devices, and may include new electronic devices with the development of technology.

Hereinafter, an electronic device according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 illustrates an electronic device in a network environment according to various embodiments of the present disclosure.

Referring to FIG. 1, an electronic device 101 in a network environment 100 according to various embodiments of the present disclosure will be described. The electronic device 101 may include a bus 110, a processor 120, a memory 130, an input/output interface 140, a display 150, and a communication interface 160. In various embodiments of the present disclosure, at least one of the foregoing elements may be omitted or another element may be added to the electronic device 101.

The bus 110 may include a circuit for connecting the above-mentioned devices to each other and transferring communications (e.g., control messages and/or data) among the above-mentioned elements.

The processor 120 may include at least one of a CPU, an AP, or a communication processor (CP). The processor 120 may perform data processing or an operation for communication and/or control of at least one of the other elements of the electronic device 101.

According to various embodiments of the present disclosure, the processor 120 may receive, from a touch screen, touch information on a touch input or a hovering input. The processor 120 may perform control, based on the touch information, so that an operation corresponding to the touch input or the hover input is performed. For example, the processor 120 may display, on the touch screen, a feedback on the touch input based on the received touch information. For example, if a user touches a certain region on the touch screen, an arrow may be displayed on a touched portion. For another example, if the user touches an icon displayed on the touch screen, an application corresponding to the touched icon may be executed on the touch screen.

The memory 130 may include a volatile memory and/or a non-volatile memory. The memory 130 may store instructions or data related to at least one of the other elements of the electronic device 101. According to an embodiment of the present disclosure, the memory 130 may store software and/or a program. The program may include, for example, a kernel 131, a middleware 133, an application programming interface (API) 135, and/or an application (or an "application program") 137. At least a portion of the kernel 131, the middleware 133, or the API 135 may be referred to as an operating system (OS).

The kernel 131 may control or manage system resources (e.g., the bus 110, the processor 120, the memory 130, or the like) used to perform operations or functions of other programs (e.g., the middleware 133, the API 135, or the application 137). Furthermore, the kernel 131 may provide an interface for allowing the middleware 133, the API 135, or the application 137 to access individual elements of the electronic device 101 to control or manage the system resources.

The middleware 133 may serve as an intermediary so that the API 135 or the application 137 communicates and exchanges data with the kernel 131.

Furthermore, the middleware 133 may handle one or more task requests received from the application 137 according to a priority order. For example, the middleware 133 may assign at least one application 137 a priority for using the system resources (e.g., the bus 110, the processor 120, the memory 130, or the like) of the electronic device 101. For example, the middleware 133 may process the one or more task requests according to the priority assigned to the at least one application, thereby performing scheduling or load balancing on the one or more task requests.

The API 135, which is an interface for allowing the application 137 to control a function provided by the kernel 131 or the middleware 133, may include, for example, at least one interface or function (e.g., instructions) for file control, window control, image processing, character control, or the like.

According to various embodiments of the present disclosure, the application 137 may include an short message service (SMS)/multimedia messaging service (MMS) application, an electronic mail application, a calendar application, an alarm application, a health care application (e.g., an application for measuring an amount of exercise or blood sugar), or an environment information application (e.g., an application for providing barometric pressure, humidity or temperature information). Additionally or alternatively, the application 137 may be an application related to information exchange between the electronic device 101 and an external electronic device (e.g., a first electronic device 102, a second electronic device 104, or a server 106). The information exchange application may include, for example, a notification relay application for relaying specific information to the external electronic device or a device management application for managing the external electronic device.

For example, the notification relay application may include a function of transferring notification information generated by another application of the electronic device 101 (e.g., an SMS/MMS application, an electronic mail application, a health care application, or an environment information application) to an external electronic device (e.g., the first electronic device 102, the second electronic device 104, or the server 106). Additionally or alternatively, the notification relay application may receive notification information from the external electronic device and may provide the received notification information to the user. The device management application may manage (e.g., install, uninstall or update) a function (e.g., turning on/off an external electronic device (or a component thereof) or adjusting brightness (or resolution) of a display) of at least a part of the external device communicating with the electronic device 101, an application operated in the external electronic device, or a service (e.g., a call service or a messaging service) provided from the external electronic device.

According to various embodiments of the present disclosure, the application 137 may include a specified application according to an attribute (e.g., the type of an electronic device) of the external electronic device. For example, if the external electronic device is an MP3 player, the application 137 may include an application related to playback of music. Similarly, if the external electronic device is a mobile medical device, the application 137 may include an application related to health care. According to an embodiment of the present disclosure, the application 137 may include at least one of an application specified for the electronic device 101 or an application received from the external electronic device.

The input/output interface 140 may serve to transfer instructions or data received from the user or another external device to other elements of the electronic device 101. For example, the input/output interface 140 may provide, to the processor 120, data received through an input/output device (e.g., a sensor, a keyboard, or a touch screen). Furthermore, the input/output interface 140 may output instructions or data received from other elements of the electronic device 101 to the user or another external device. For example, the input/output interface 140 may output data processed by the processor 120 to the user through an input/output device (e.g., a speaker or a display).

The display 150 may include, for example, a liquid crystal display (LCD), a light-emitting diode (LED) display, an organic LED (OLED) display, a microelectromechanical systems (MEMS) display, or an electronic paper display. The display 150 may present various content (e.g., a text, an image, a video, an icon, a symbol, or the like) to the user. The display 150 may include a touch screen, and may receive a touch, gesture, proximity or hover input by an electronic pen or a part of a body of the user.

The communication interface 160 may form a communications link between the electronic device 101 and an external device (e.g., the first electronic device 102, the second electronic device 104, or the server 106). For example, the communication interface 160 may be connected to a network 162 through wireless or wired communications to communicate with the external device (e.g., the second electronic device 104 or the server 106).

For example, at least one of cellular communication protocols such as long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), or the like may be used for the wireless communications. The wireless communications may include, for example, a short-range communication link 164. The short-range communication link 164 may include at least one of wireless fidelity (Wi-Fi), Bluetooth®, near field communication (NFC), GPS, or the like. The wired communications may include at least one of universal serial bus (USB), high definition multimedia interface (HDMI), recommended standard 232 (RS-232), plain old telephone service (POTS), or the like. The network 162 may include at least one of telecommunications networks, for example, a computer network (e.g., a local-area network (LAN) or wide area network (WAN)), the Internet, or a telephone network.

According to an embodiment of the present disclosure, the telecommunications network may include at least one of a computer network, the Internet, the Internet of things, or a telephone network.

According to an embodiment of the present disclosure, a protocol (e.g., a transport layer protocol, a data link layer protocol or a physical layer protocol) for communication between the electronic device 101 and an external device (e.g., the first electronic device 102, the second electronic device 104, or the server 106) may be supported by at least one of the kernel 131, the middleware 133, the API 135, the application 137, or the communication interface 160.

The types of the first and second electronic devices 102 and 104 may be the same as or different from the type of the electronic device 101. According to an embodiment of the present disclosure, the server 106 may include a group of one or more servers. According to various embodiments of the present disclosure, a portion or all of operations performed in the electronic device 101 may be performed in one or more other electronic devices (e.g., the first electronic device 102, the second electronic device 104, or the server 106). According to an embodiment of the present disclosure, in the case where the electronic device 101 should perform a certain function or service automatically or in response to a request, the electronic device 101 may request at least a portion of functions related to the function or service from another device (e.g., the first electronic device 102, the second electronic device 104, or the server 106) instead of or in addition to performing the function or service for itself. The other electronic device (e.g., the first electronic device 102, the second electronic device 104, or the server 106) may perform the requested function or additional function, and may transfer a result of the performance to the electronic device 101. The electronic device 101 may use the received result or additionally process the received result to provide the requested function or service. To this end, for example, a cloud computing technology, a distributed computing technology, or a client-server computing technology may be used.

Figure 2:
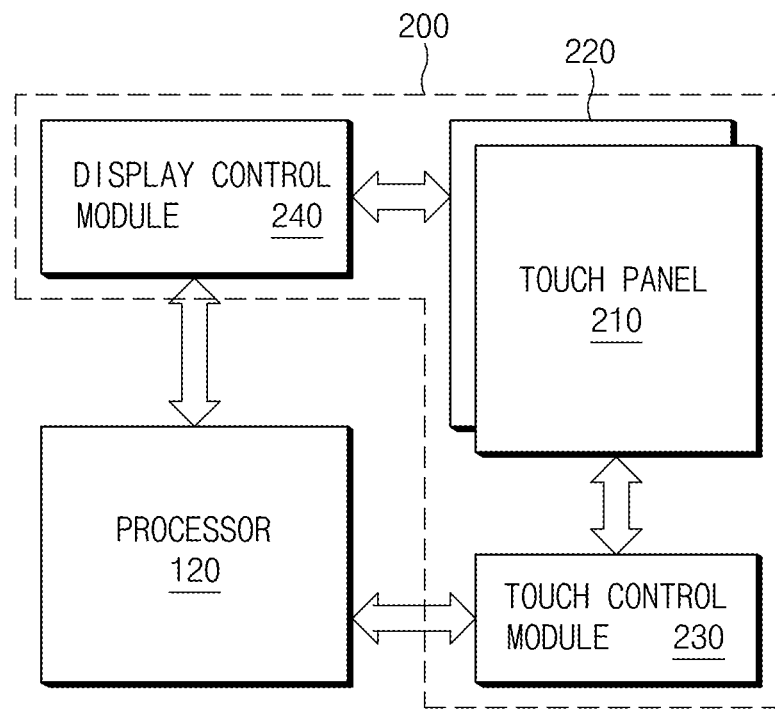
FIG. 2 is a block diagram of a touch screen according to various embodiments of the present disclosure.

FIG. 2 is a block diagram of a touch screen according to various embodiments of the present disclosure.

Referring to FIG. 2, a touch screen 200 may include a touch panel 210 for sensing a touch input, a hovering input, a gesture, or proximity of an input source, a display panel 220 for displaying information, a touch control module 230 for controlling operation of the touch panel 210, and a display control module 240 for controlling operation of the display panel 220.

Referring to FIG. 2, the touch panel 210 and the display panel 220 may be coupled so as to be implemented as one touch screen panel. For example, the touch panel 210 may be added on the touch screen 200 (an add-on type), or may be inserted into the touch screen 200 (an on-cell type or in-cell type). The touch panel 210 may be implemented using various types of touch panels such as a resistive type, an electromagnetic induction type, a capacitive type, an ultrasonic type, an infrared type, or the like.

The touch panel 210 may include a plurality of touch sensors for sensing at least one of a pressure change, an electric/magnetic field change, a capacitance change, or a light intensity change induced by a touch input, a hovering input, a gesture input, or proximity to a surface of the touch panel 210.

For example, each touch sensor may receive a driving signal (e.g., a pulse or the like) at intervals of a specified time (e.g., a transmit (Tx) driving frequency) through a Tx channel connected to each touch sensor, and may transmit an electric signal (e.g., a voltage or the like) indicating a state of each touch sensor (e.g., a pressure, a magnetic field, a capacitance, a light intensity, or the like) through a receive (Rx) channel corresponding to the Tx channel (or the driving signal). The touch control module 230 may recognize a pressure applied to the touch panel 210, by monitoring the state of each touch sensor.

According to various embodiments of the present disclosure, the touch panel 210 may further include a circuit or an element for driving the touch panel 210, such as a Tx channel, an Rx channel, or an analog-to-digital converter (ADC).

The display panel 220 may display various information (e.g., multimedia data, text data, or the like) on a screen. The display panel 220 may display information according to a control signal received from the display control module 240. For example, the display panel 220 may display a feedback on a touch input in response to the touch input sensed by the touch panel 210. For example, the display panel 220 may display an icon, an image, a video, or the like on a location corresponding to the touch input. Alternatively, the display panel 220 may display an application executed in response to the touch input. According to various embodiments of the present disclosure, the display panel 220 may further include a circuit or an element for driving the display panel 220.

The touch control module 230 may generate, based on a signal received from the touch panel 210 (e.g., the electric signal transmitted through the Rx channel or a digital signal obtained through analog-to-digital conversion of the electric signal), input information (e.g., a touch report) including at least one of information obtainable from the received signal in relation to an input sensed by the touch panel 210, proximity information, a gesture, a hovering area size, a hovering location (e.g., hovering coordinates, a hovering area, or the like), a pressure, a sensitivity, a touch area size, a touch location (e.g., touch coordinates, a touch area, a single touch, a multi-touch, or the like), or identification information.

According to various embodiments of the present disclosure, the touch control module 230 may perform data processing (or signal processing) with respect to the signal received from the touch panel 210, such as removing a noise, selecting a valid input equal to or larger than a threshold (e.g., at least one of a signal level, a duration time, or the number of frames), selecting an input to a specified area, calculating a touch location, a touch area size, a hovering location, or a hovering area size, or recognizing a gesture or proximity information corresponding to an input. The threshold may correspond to a reference value for selecting the valid input. The threshold may vary with the type of an input. For example, if a level of the received signal is equal to or higher than the threshold, the touch control module 230 may be configured to recognize that a valid input is made by the user, generate a touch event (or interrupt) indicating the occurrence of the input in response to the valid input, and transfer (i.e., provide) the touch event to the processor 120. The processor 120 may appropriately respond to the input from the user according to the touch event. On the contrary, if the level of the received signal is lower than the threshold, the touch control module 230 may ignore the received signal.

The touch control module 230 may transfer the generated input information to the processor 120. According to an embodiment of the present disclosure, if the input corresponds to a touch input or a hovering input, the touch control module 230 may transfer the input information to the processor 120 only when a recognized touch location or hovering location is changed.

In an embodiment of the present disclosure, the touch control module 230 and the display control module 240 may correspond to control circuits (e.g., a touch control circuit, a touch integrated circuit (IC), a display driving circuit, a display driver IC (DDIC), or the like) for controlling the touch panel 210 and the display panel 220.

The touch screen 200 may be changed into an idle state or an active state. For example, if an input is not sensed by the touch panel 210 for a specified time, the touch screen 200 may be changed into the idle state. For another example, if a touch input (or a hovering, gesture or proximity input) is recognized in the idle state, the touch screen 200 may be changed into the active state.

The idle state may represent a state in which at least a portion of functions of the touch screen 200 may be disabled, a state in which an operating frequency of the touch screen may be set lower, or a standby state for reducing power consumption when input is not sensed for a specified time. That is, all the functions of the touch screen 200 are performed normally in the active state, whereas at least a portion of the functions of the touch screen 200 may be disabled in the idle state. In the idle state, the touch panel 210 may scan the state of each touch sensor at intervals of a specified time to sense an input that occurs on each touch sensor, and may transfer, to the touch control module 230, a signal indicating the state of each touch sensor. The touch control module 230 may determine whether a touch input (or a hovering, gesture or proximity input) occurs based on the signal received from the touch panel 210. However, the touch control module 230 may not transfer obtained input information (e.g., the touch report) to the processor 120 in the idle state.

The touch control module 230 may change a rate or frequency (e.g., a touch report rate) of transferring the input information to the processor 120. The rate of transferring the input information from the touch control module 230 to the processor 120 may be differentiated from a rate of scanning the touch sensors to sense a touch input (or a hovering, gesture, or proximity input), a rate of transferring a driving signal to each touch sensor through the Tx channel (e.g., a Tx driving frequency), or a rate of monitoring a signal sensed by each touch sensor through the Rx channel (e.g., an Rx driving frequency) in the touch panel 210. For example, if the rate of transferring the input information is not sufficiently high, a response rate, which is a rate of responding to a touch input from the user by the electronic device 101, may decrease. For example, an appropriate response to an initial touch input (a touch input performed within a predetermined time from a time at which a starting touch input is performed) or a touch input of a quick continuous motion such as a flick may not be performed, or a response thereto may be slow, so that sufficient touch performance of the electronic device 101 may not be ensured. However, if the rate of transferring the input information from the touch control module 230 is increased in order to avoid such a situation, the input information may be transferred at an unnecessarily high rate when a normal transferring rate is sufficient such as a dragging by touch is performed, so that current consumption of the electronic device 101 may excessively increase.

According to an embodiment of the present disclosure, the touch control module 230 may change the rate of transferring the input information based on at least a part of an input sensed by the touch panel 210 (a signal) received from the touch panel 210 and/or information obtained from the received signal). That is, the touch control module 230 may determine the rate of transferring the input information based on at least a part of the input sensed by the touch panel 210.

Alternatively, the touch control module 230 may receive, from the processor 120, the rate of transferring the input information and may change a previous rate of transferring the input information into the received rate. For example, the processor 120 may determine the rate of transferring the input information based on at least a part of the input information received from the touch control module 230, and may transmit the determined transferring rate to the touch control module 230. For example, the processor 120 may check occurrence of a touch, movement/movement distance of a touch, or release of a touch based on the input information (e.g., the touch report) received through the touch control module 230, and may determine the rate of transferring the input information based on a history of a touch input. The touch control module 230 may transfer the input information such as touch coordinates to the processor 120 at the determined transferring rate.

Alternatively, the touch control module 230 may receive, through the input/output interface 140, the rate of transferring the input information, and may change a previous rate of transferring the input information into the received rate. For example, the input/output interface 140 may transfer, to the touch control module 230, a transferring rate input by the user.

The touch control module 230 may determine the rate of transferring the input information based on at least a part of the input sensed by the touch panel 210. However, an embodiment of the present disclosure is not limited thereto, and the rate of transferring the input information may be determined by the processor 120 or another module (e.g., at least one processor different from the processor 120 or the input/output interface 140) of the electronic device 101 and may be transferred to the touch control module 230.

According to an embodiment of the present disclosure, the touch control module 230 may change the rate of transferring the input information into one of a plurality of transferring rates according to at least a part of the input sensed by the touch panel 210. For example, the touch control module 230 may change the rate of transferring the input information into one of a first rate (or a first frequency) and a second rate (or a second frequency). The touch control module 230 may change the rate of transferring the input information into one of the two rates. However, an embodiment of the present disclosure is not limited thereto, and the touch control module 230 may change the rate of transferring the input information into one of two or more rates. The number of available rates and the levels thereof may vary with an application, a power use mode, etc. in the electronic device 101. Furthermore, the number of available rates and the levels thereof may vary with hardware specifications of the electronic device 101.

The first rate and the second rate may be determined as described below. The first rate may correspond to a higher transferring rate (e.g., a high rate) than the second rate, which corresponds to the normal rate. For example, the first rate may represent a rate which is sufficient to respond to an initial touch input (a touch input performed within a predetermined time from a time at which a starting touch input is performed) or a touch input of a quick continuous motion (e.g., a flick). For example, the first rate may be about 90 Hz or higher, i.e., a maximum rate which is allowable according to hardware specifications of the touch control module 230. The second rate may correspond to a normal rate of transferring the input information. For example, the second rate may represent a rate for ensuring sufficient touch performance with respect to a normal touch input other than the touch input of a quick continuous motion or the initial touch input. For example, the second rate may be about 60 Hz or a frame change rate of the display panel 220 of the touch screen 200. Accordingly, the second rate may be lower than the first rate.

According to various embodiments of the present disclosure described below, the touch control module 230 may change the rate of transferring the input information into one of the first and second rates according to at least a part of the input sensed by the touch panel 210.

According to an embodiment of the present disclosure, if a touch input corresponds to a starting touch input, the touch control module 230 may change the rate of transferring the input information into the first rate. The starting touch input may represent a firstly obtained touch input among a series of touch inputs obtained based on signals received by the touch control module 230 from each touch sensor until a touch on the touch panel 210 is released. Whether the touch input corresponds to the starting touch input may be determined by the touch control module 230 based on at least a part of the input sensed by the touch panel 210. This operation is described below with reference to FIG. 3.

According to an embodiment of the present disclosure, if the number of times of transferring the input information counted by the touch control module 230 becomes equal to or larger than a threshold, the touch control module 230 may change the rate of transferring the input information in the second rate. For example, when a touch is maintained without being released after a starting touch input is sensed, the touch control module 230 may count the number of times of transferring the input information. This operation is described below with reference to FIG. 4.

According to an embodiment of the present disclosure, if a time equal to or longer than a specified amount (e.g., a threshold) elapses, the touch control module 230 may change the rate of transferring the input information into the second rate. For example, when a touch is maintained without being released after a starting touch input is sensed, the touch control module 230 may count an elapsed time since occurrence of the touch. This operation is described below with reference to FIG. 4.

According to an embodiment of the present disclosure, if a movement distance of a touch becomes equal to or larger than a threshold, the touch control module 230 may change the rate of transferring the input information into the second rate. For example, when a touch is maintained without being released after a starting touch input is sensed, the touch control module 230 may count the movement distance of the touch. This operation is described below with reference to FIG. 4.

According to an embodiment of the present disclosure, if a touch input is positioned on a specified area on a touch screen, the touch control module 230 may change the rate of transferring the input information into the first rate. The touch control module 230 may determine whether the touch input is positioned on the specified area based on touch coordinate information obtained based on a signal received from the touch panel 210. This operation is described below with reference to FIG. 6.

According to an embodiment of the present disclosure, if a touch is released, the touch control module 230 may change the rate of transferring the input information into the second rate. The touch control module 230 may determine whether a previous touch input is released based on a signal received from the touch panel 210. This operation is described below with reference to FIGS. 7A and 7B.

According to various embodiments of the present disclosure, the touch control module 230 may be implemented with a microcontroller unit (MCU) or at least one processor. The touch control module 230 may include a firmware for driving the MCU or at least one processor. Furthermore, the touch control module 230 may transmit/receive data or instructions to/from the processor 120. According to various embodiments of the present disclosure, the touch control module 230 may transfer the input information to the processor 120 using a serial interface such as an inter-integrated circuit (I2C) interface.

The display control module 240 may receive, from the processor 120, data to be displayed on the display panel 220. The display control module 240 may perform, based on the received data, signal processing on a signal to be transmitted to the display panel 220. The display control module 240 may transmit the signal to the display panel 220 so that information may be displayed on the display panel 220.

The electronic device 101 according to various embodiments of the present disclosure includes the touch screen 200 configured to transfer a touch or hovering input by an external object to a processor at a selected frequency and at least one processor 120 electrically connected to the touch screen 200, wherein the touch screen 200 may monitor the input sensed by the touch panel 210 of the touch screen 200 and may dynamically change the frequency into one selected from among a plurality of, at least two, frequencies based at least on the monitored input.

According to various embodiments of the present disclosure, the at least two frequencies include a first frequency and a second frequency higher than the first frequency, and the touch screen 200 may change the frequency into one selected from among the first and second frequencies in response to the input.

According to various embodiments of the present disclosure, the touch screen 200 may change the frequency into the second frequency if the input corresponds to a starting touch input.

According to various embodiments of the present disclosure, the touch screen 200 may change the frequency into the first frequency if the input is released.

According to various embodiments of the present disclosure, the touch screen 200 may count the number of times of transferring the input while the input is maintained, and may change the frequency into the first frequency if the counted number of times of transferring the input is larger than a specified threshold.

According to various embodiments of the present disclosure, the touch screen 200 may calculate a movement distance of the input while the input is maintained, and may change the frequency into the first frequency if the calculated movement distance is larger than a threshold.

According to various embodiments of the present disclosure, the touch screen 200 may change the frequency into the first frequency if an elapsed time since occurrence of the input is larger than a threshold while the input is maintained.

According to various embodiments of the present disclosure, the touch screen 200 may change the frequency into the first frequency if the input is moved to a specified area 10 on the touch panel 210.

According to various embodiments of the present disclosure, the first frequency or the second frequency may be set for each application or each power use mode.

Figure 3:
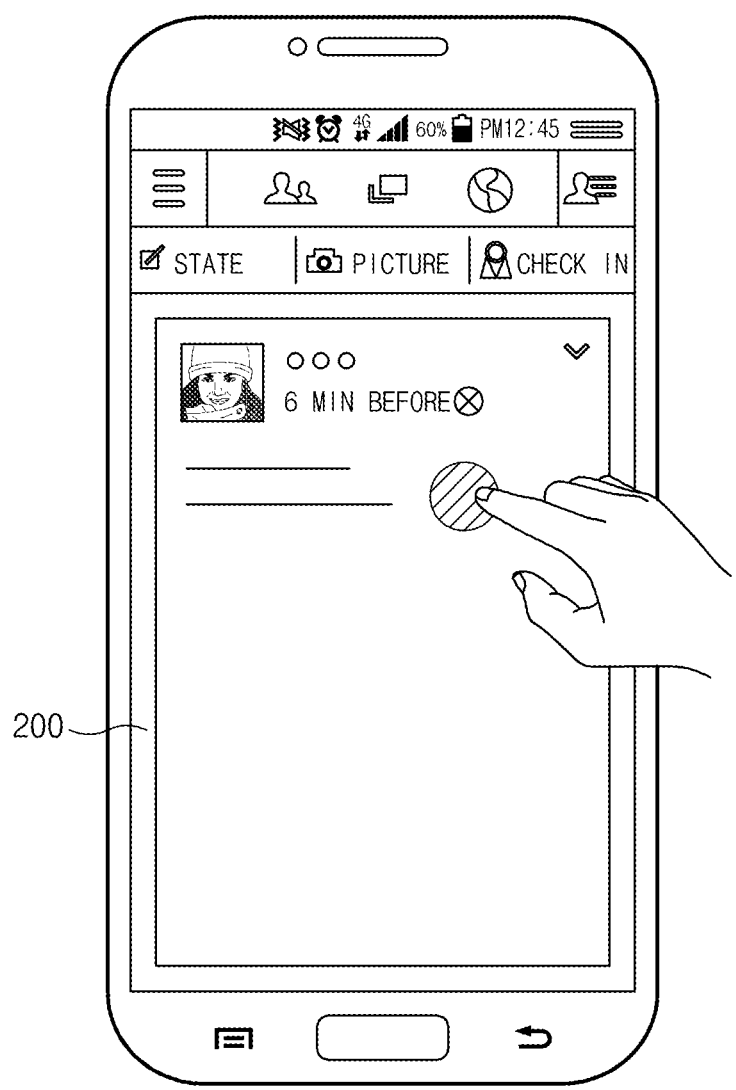
FIG. 3 is a diagram illustrating changing a touch report rate when a starting touch input is sensed according to various embodiments of the present disclosure.

FIG. 3 is a diagram illustrating changing a touch report rate when a starting touch input is sensed according to various embodiments of the present disclosure.

If a touch input corresponds to a starting touch input, the touch control module 230 may transfer the input information to the processor 120 at a higher rate (the first rate in the above-mentioned example) than a normal transferring rate.

Referring to FIG. 3, if a touch on the touch screen 200 is initiated, the touch control module 230 may sense a starting touch input based on a signal received from each touch sensor. For example, the starting touch input may include a touch input performed in the idle state or a touch input performed when there is no history of a previous touch input or a previous touch input is released.

According to an embodiment of the present disclosure, if a part of the signal received from each touch sensor corresponds to a valid touch input in the idle state, the touch screen 200 may be changed into the active state and may determine the corresponding touch input as a starting touch input.

According to an embodiment of the present disclosure, if a part of the signal received from each touch sensor corresponds to a valid touch input in a state in which there is no history of a previous touch input after the electronic device 101 is booted, the touch screen 200 may determine the corresponding touch input as a starting touch input.

According to an embodiment of the present disclosure, if a part of the signal received from each touch sensor corresponds to a valid touch input after a previous touch input is released in the active state, the touch screen 200 may determine the corresponding touch input as a starting touch input.

The touch control module 230 may perform an appropriate response to an initial touch input (i.e., a touch input performed within a predetermined time from a time at which a starting touch input is performed) or a touch input of a quick continuous motion such as a flick, by changing the rate of transferring the input information into a higher rate than a normal transferring rate in response to a starting touch point. Accordingly, sufficient touch performance of the electronic device 101 may be ensured.

Figure 4:
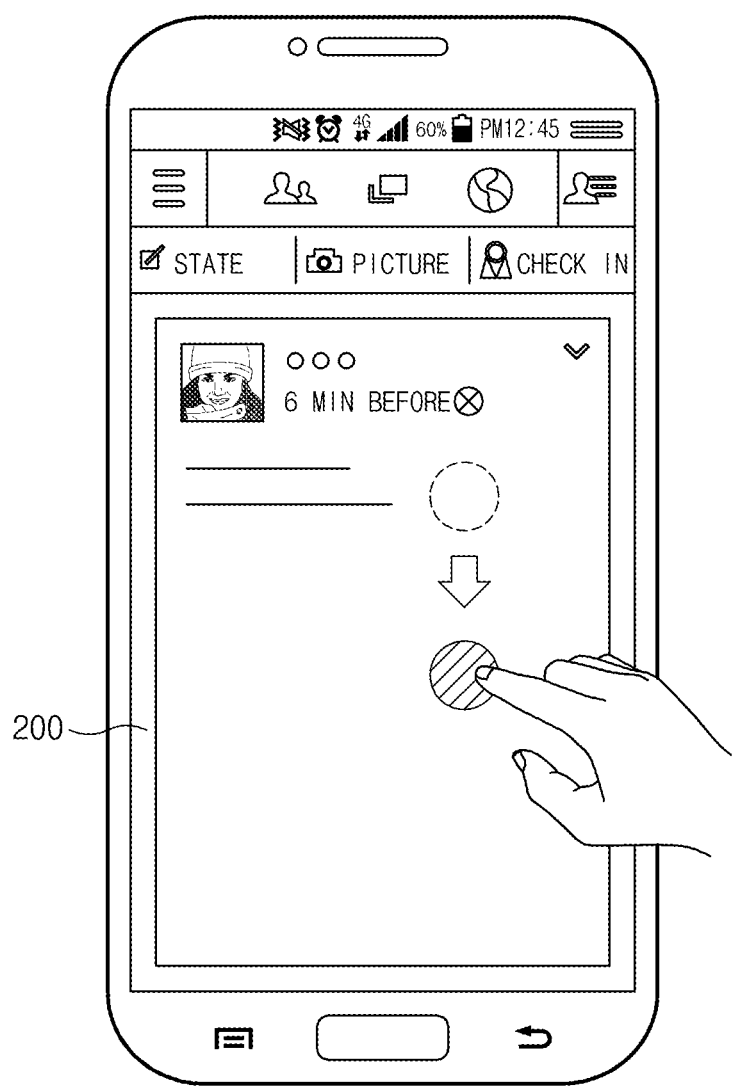
FIG. 4 is a diagram illustrating changing a touch report rate when a touch on a touch screen is maintained according to various embodiments of the present disclosure.

FIG. 4 is a diagram illustrating changing a touch report rate when a touch on a touch screen is maintained according to various embodiments of the present disclosure.

The touch control module 230 may determine whether a previously sensed touch is released based on a signal received from each touch sensor.

Referring to FIG. 4, if a touch on the touch screen 200 is maintained without being released, the touch control module 230 may change the rate of transferring the input information into a normal transferring rate (the second rate in the above-mentioned example) based on at least one of the counted number of times of transferring the input information, the elapsed time since occurrence of the input, or the movement distance of the touch.

According to an embodiment of the present disclosure, if the counted number of times of transferring the input information becomes equal to or larger than a threshold and the touch is not released, the touch control module 230 may transfer the input information to the processor 120 at the normal transferring rate (i.e., the second rate in the above-mentioned example). For example, the touch control module 230 may start to count the number of times of transferring the input information when the touch starting input is obtained. Alternatively, the touch control module 230 may start to count the number of times of transferring the input information when a touch input following the starting touch input is obtained. However, an embodiment of the present disclosure is not limited thereto, and the touch control module 230 may start to count the number of times of transferring the input information after the touch is moved by a specified distance from the starting touch input or after an elapsed time since occurrence of the starting touch input. The number of times of transferring the input information being counted may be initialized regardless of the threshold if the touch maintained is released.

According to an embodiment of the present disclosure, if a measured elapsed time becomes equal to or larger than a threshold while the touch is maintained, the touch control module 230 may transfer the input information to the processor 120 at the normal transferring rate (i.e., the second rate in the above-mentioned example). For example, the touch control module 230 may start to measure time when the touch starting input is obtained. Alternatively, the touch control module 230 may start to measure the time elapsed after the touch is moved by a specified distance from the starting touch input or when the number of times of transferring the input information exceeds a specified number. The elapsed time may be initialized regardless of the threshold if the touch is released.

According to an embodiment of the present disclosure, if an obtained movement distance of the touch becomes equal to or larger than a threshold while the touch is maintained, the touch control module 230 may transfer the input information to the processor 120 at the normal transferring rate (the second rate in the above-mentioned example). For example, the touch control module 230 may start to obtain the movement distance of the touch when the touch starting input is obtained. Alternatively, the touch control module 230 may start to obtain the movement distance of the touch after an elapsed time since occurrence of the touch starting input or when the number of times of transferring the input information exceeds a specified number. The movement distance of the touch may be initialized regardless of the threshold if the touch is released.

After the starting touch input is obtained, if a certain condition, such as an elapsed time, reaching a specified number of times of transmitting the input information, or movement by a specified distance, is satisfied, the normal transferring rate may ensure sufficient touch performance and, thus, the touch control module 230 may change the transferring rate into the second rate to reduce unnecessary power consumption.

Figure 5:
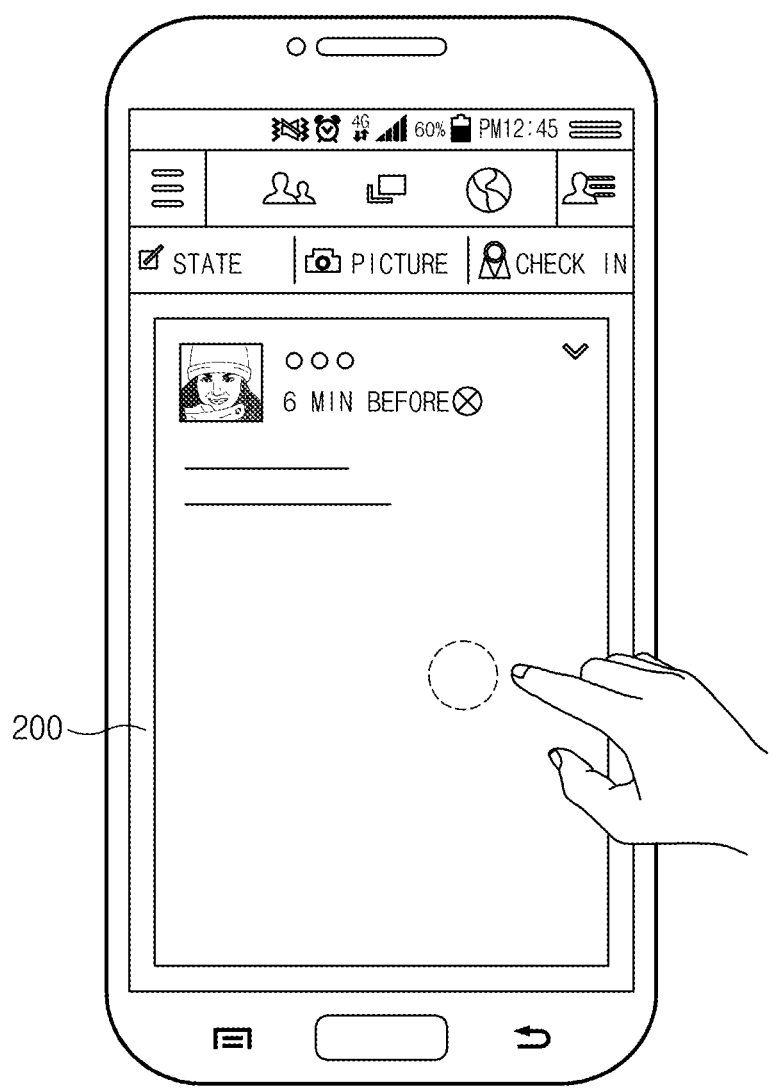
FIG. 5 is a diagram illustrating changing a touch report rate when a touch is released according to various embodiments of the present disclosure.

FIG. 5 is a diagram illustrating changing a touch report rate when a touch is released according to various embodiments of the present disclosure.

Referring to FIG. 5, if a touch is released from the touch screen 200, the touch control module 230 may transfer the input information to the processor 120 at the normal transferring rate (i.e., the second rate in the above-mentioned example). The touch control module 230 may determine whether a previously sensed touch is released based on a signal received from each touch sensor. For example, the touch control module 230 may determine, based on the signal received from each touch sensor, that the touch is released if no touch input is sensed by the touch panel 210 through monitoring by each touch sensor performed immediately after the previous touch input is recognized.

The release of a touch may occur when the transferring rate of the touch control module 230 is a higher rate (e.g., the first rate) than the normal transferring rate or is the normal transferring rate (e.g., the second rate). If the touch control module 230 does not change the first rate into the second rate when the touch is released while the touch control module 230 maintains the first rate, the touch control module 230 continues to transfer the input information to the processor 120 at an unnecessarily high rate until a next input occurs or the touch screen 200 enters the idle state, thereby causing unnecessary power consumption.

Therefore, if the touch is released, the touch control module 230 may change the transferring rate into the normal transferring rate, i.e., the second rate, so that unnecessary power consumption may be reduced.

After the touch is released, the touch screen 200 may maintain the active state until entering the idle state due to an elapsed time of inactivity, and the touch control module 230 may receive, from the touch panel 210, a signal indicating a state of each touch sensor and may transfer the input information to the processor 120 at the normal transferring rate.

If no touch input is sensed by the touch panel 210 for a specified time after the touch is released, the touch screen 200 may be changed into the idle state. In the idle state, the touch control module 230 may receive, from the touch panel 210, the signal indicating the state of each touch sensor, but may not transfer the input information to the processor 120.

Figure 6:
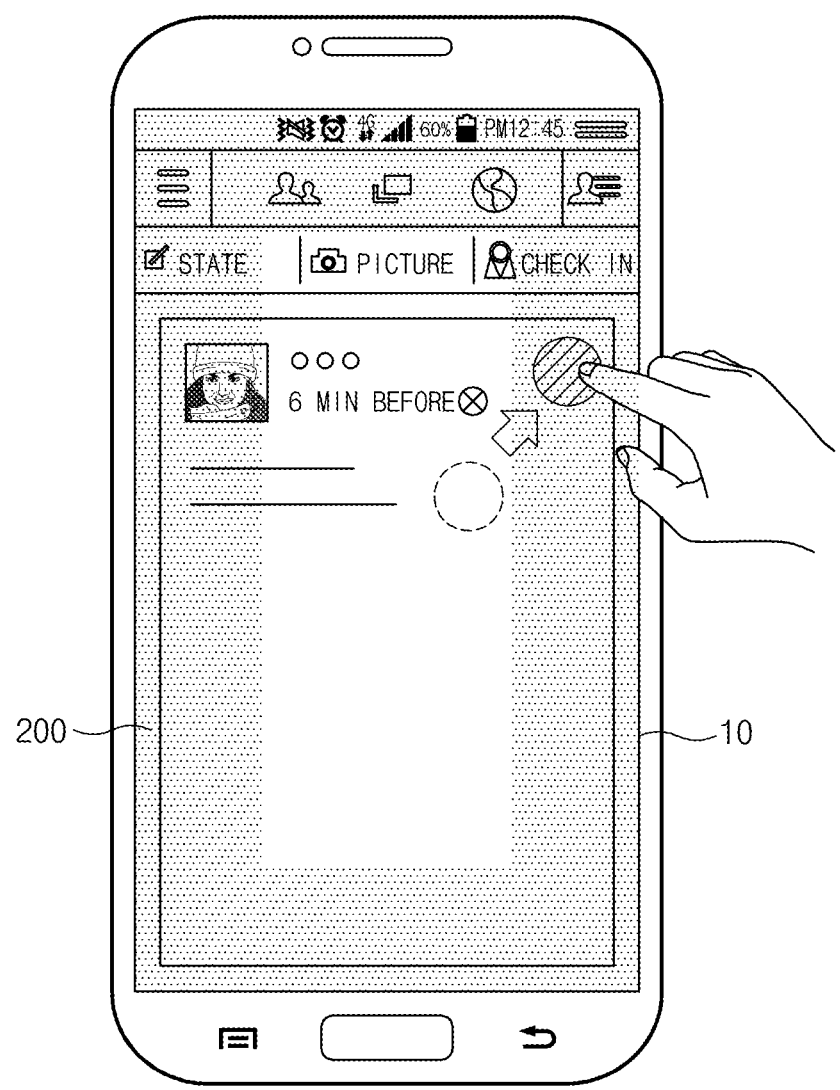
FIG. 6 is a diagram illustrating changing a touch report rate when a touch input is positioned on a specified area according to various embodiments of the present disclosure.

FIG. 6 is a diagram illustrating changing a touch report rate when a touch input is positioned on a specified area according to various embodiments of the present disclosure.

Referring to FIG. 6, if a touch input is positioned on a specified area 10 of the touch screen 200, the touch control module 230 may transfer the input information to the processor 120 at a higher transferring rate (the first rate in the above-mentioned example) than a normal transferring rate. The touch control module 230 may determine coordinates of the touch input based on a signal received from each touch sensor, and may determine whether the touch input is positioned on the specified area 10 based on coordinate information.

For example, the touch control module 230 may include a partial area of an edge of the touch panel 210 (e.g., a border region) as the specified area 10. For example, as illustrated in FIG. 6, the user may quickly draw a line on the touch panel 210 using a finger or a stylus pen. If the line being drawn approaches the edge of the touch panel 210, touch coordinates of a partial area of the edge may not be transferred normally even if it is touched since the touch panel 210 contacts a boundary of a frame surrounding the touch panel 210. Therefore, if the touch input is positioned on the specified area 10 on the touch panel 210, the transferring rate may be changed into the first rate higher than the normal transferring rate so that the input information (e.g., touch coordinates) of the touch input may be accurately transferred (or reported) even for a corner end of the touch panel 210.

However, the specified area 10 is not limited to that illustrated in FIG. 6, and may include various areas (e.g., an area for which sufficient touch performance is not ensured by the normal transferring rate or an area within a specified distance from the foregoing area) on the touch panel 210 according to various embodiments of the present disclosure.

As described above, if the touch input is positioned in an area that sufficient touch performance is not ensured by the normal transferring rate, the touch control module 230 may change the transferring rate into a higher rate so that a response to a touch may be faster.

Figure 7A:
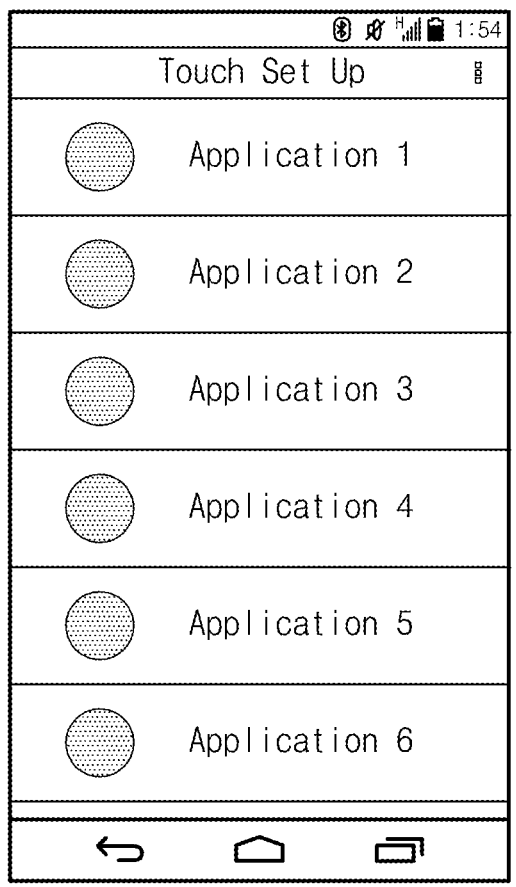
FIGS. 7A and 7B are diagrams illustrating a user interface for setting a touch report rate for each application according to various embodiments of the present disclosure.
Figure 7B:
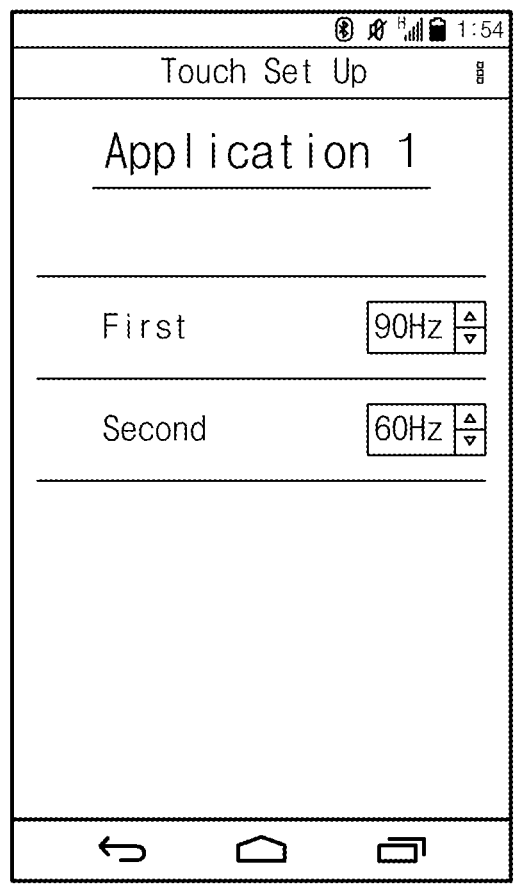

FIGS. 7A and 7B are diagrams illustrating a user interface for setting a touch report rate for each application according to various embodiments of the present disclosure.

Referring to FIGS. 7A and 7B, the electronic device 101 may set the number of available transferring rates and respective levels thereof for each application. For example, if an application executed in the electronic device 101 induces frequent occurrence of a touch or touch responsiveness is important for the application, the electronic device 101 may change, for such an application, a value of at least one of the first rate (higher rate than a normal transferring rate) of transferring the input information or the second rate (normal transferring rate) of transferring the input information into a higher value than a current value. For example, the electronic device 101 may set the touch report rate for an application (e.g., a game application) for which the touch responsiveness is important so that the first rate is changed into 90 Hz if the first rate set in the electronic device 101 is 80 Hz. For another example, the electronic device 101 may set the touch report rate for an application that does not induce frequent occurrence of a touch input so that the input information is transferred only at the second rate without applying a process of changing the transferring rate according to an input. For another example, the electronic device 101 may set, for each application, an area for which a response to a touch is required to be fast, or may set, for each application, whether to use a specified area.

According to an embodiment of the present disclosure, the electronic device 101 may receive, via the input/output interface 140, a user input for setting the number of available transferring rates and respective levels thereof for each application. For example, as illustrated in FIGS. 7A and 7B, the user may set the first rate or the second rate for each application. For another example, the user may set, for each application, the touch report rate so that the input information is transferred only at one rate or the transferring rate is changed into three or more rates based on an input. For another example, the user may set, for each application, an area for which a response to a touch is required to be fast, or may select, for each application, whether to use a specified area.

According to an embodiment of the present disclosure, the electronic device 101 may set the number of available transferring rates and respective levels thereof according to a power use mode (e.g., a power saving mode, an ultra power saving mode, or the like). For example, if the electronic device 101 has little remaining power, the electronic device 101 may be changed into the ultra power saving mode, and, to reduce current consumption, the electronic device 101 may be set to transfer the input information only at the second rate without changing the touch report rate. Alternatively, the electronic device 101 may decrease the second rate to a lower rate (a third rate) in order to further reduce current consumption. For another example, if power of the electronic device 101 decreases to a threshold or lower, or the electronic device 101 arrives at a specified place or a specified time, the electronic device 101 may be changed into the power saving mode, and may decrease the level of the first rate or the second rate in order to reduce current consumption.

According to an embodiment of the present disclosure, the electronic device 101 may receive, via the input/output interface 140, a user input for setting the number of available transferring rates and respective levels thereof for each power use mode. For example, in a similar manner to that illustrated in FIGS. 7A and 7B, the user may set the first rate or the second rate according to a power use mode. For another example, the user may set, for each power use mode, the touch report rate so that the input information is transferred only at one rate or the transferring rate is changed into three or more rates based on an input. For another example, the user, for each power use mode, may reduce or extend an area for which a response to a touch is required to be fast or may select whether to use a specified area.

Figure 8:
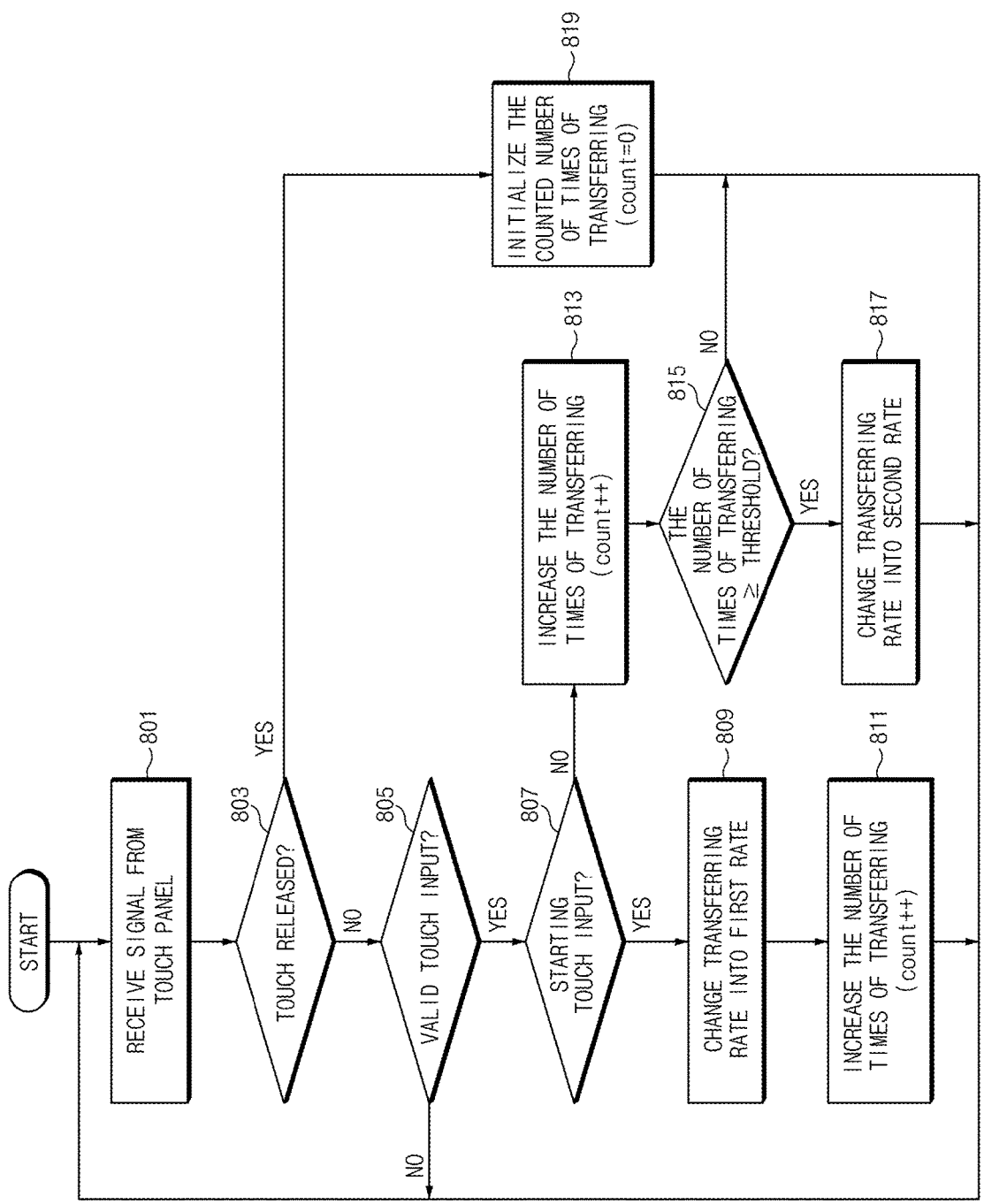
FIG. 8 is a flowchart of a method for controlling touch report rate according to various embodiments of the present disclosure.

FIG. 8 is a flowchart of a method for controlling touch report rate according to various embodiments of the present disclosure.

Referring to FIG. 8, the illustrated method includes operations performed by the electronic device illustrated in FIGS. 1 and 2. Therefore, it would be understood that the above descriptions of the electronic device 101 illustrated FIGS. 1 and 2 may be applied to the method illustrated in FIG. 8 even if the descriptions are omitted below.

In operation 801, the touch control module 230 may receive, from the touch panel 210, a signal indicating a state of each touch sensor. For example, the touch control module 230 may periodically receive the signal from each touch sensor to monitor the state of each touch sensor.

In operation 803, the touch control module 230 may determine whether a previously sensed touch is released based on the signal received from each touch sensor. For example, while periodically receiving the signal from the touch panel 210, the touch control module 230 may determine that the touch is released if a touch input is recognized from a previously received signal but no touch input is sensed from the following signal.

If the touch is not released, the touch control module 230 may perform operation 805, but, if the touch is released, the touch control module 230 may perform operation 819.

In operation 805, the touch control module 230 may determine whether a valid touch input exists based on the signal received from each touch sensor. For example, the touch control module 230 may select a valid touch input by comparing the signal received from the touch panel 210 (or a signal obtained by performing signal processing on the received signal) with a threshold (e.g., at least one of a signal level, a duration time, or the number of frames).

If there is a valid touch input, the touch control module 230 may perform operation 807, but, if there is no valid touch input, the touch control module 230 may return back to operation 801 until a valid touch input is received.

In operation 807, the touch control module 230 may determine whether a touch sensed by the touch panel 210 corresponds to a starting touch input based on the signal received from each touch sensor. For example, the touch control module 230 may identify the starting touch input by determining whether a valid touch input is sensed while in the idle state of the touch screen 200 or if a touch input is sensed when there is no previous touch input or after a previous touch input is released.

If the valid touch input corresponds to the starting touch input, the touch control module 230 may perform operation 809, but, if the valid touch input does not correspond to the starting touch input, the touch control module 230 may perform operation 813.

In operation 809, the touch control module 230 may change the rate of transferring the input information into the first rate. In an embodiment of the present disclosure, the touch control module 230 may change the rate of transferring the input information into one of the first rate and the second rate. The first rate may correspond to a higher transferring rate than the second rate, which is the normal transferring rate. For example, the first rate may represent a rate which is sufficient to respond to an initial touch input (a touch input performed within a predetermined time from a time at which a starting touch input is performed) or a touch input of a quick continuous motion (e.g., a flick).

In operation 811, the touch control module 230 may increase the number of times of transferring the input information. For example, if the starting touch input is sensed, the touch control module 230 may count the number of times of transferring the input information.

In operation 813, the touch control module 230 may increase the number of times of transferring the input information. For example, when a touch is maintained without being released after the starting touch input is sensed, the touch control module 230 may count the number of times of transferring the input information.

In operation 815, the touch control module 230 may determine whether the number of times of transferring the input information is equal to or larger than a threshold. The threshold may represent a reference value of the number of times of transferring the input information before changing the transferring rate from the first rate into the second rate. That is, when the number of times of transferring the input information is equal to or larger than the threshold, the touch control module 230 is not required to maintain a high transferring rate. The threshold may vary with an electronic device, a user, an application, or a power use mode.

If the number of times of transferring the input information is equal to or larger than the threshold, the touch control module 230 may perform operation 817, but, if the number of times of transferring the input information is smaller than the threshold, the touch control module 230 may return back to operation 801.

In operation 817, the touch control module 230 may change the rate of transferring the input information to the second rate. The second rate may correspond to the normal transferring rate. For example, the second rate may represent a transferring rate for ensuring sufficient touch performance with respect to a normal touch input other than a touch input of a quick continuous motion or an initial touch input.

If the touch that has been maintained since occurrence of the touch is released, the touch control module 230 may initialize the counted number of times of transferring the input information (count=0) in operation 819.

If the touch is maintained without being released so that the number of times of transferring the input information is kept equal to or larger than a specified number, the touch control module 230 may change the transferring rate into the normal transferring rate to reduce unnecessary power consumption while performing a response to a touch input at an appropriate rate.

Figure 9:
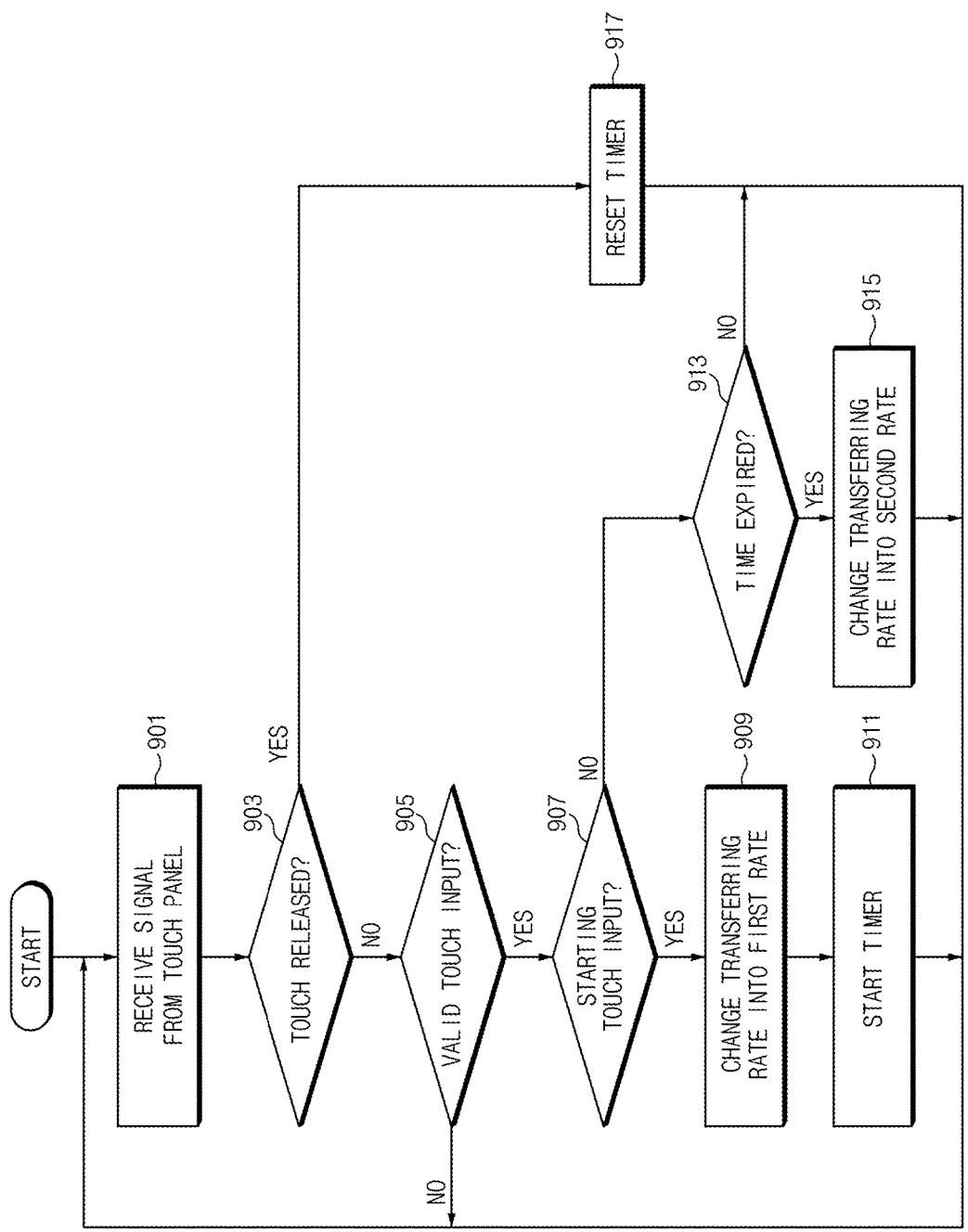
FIG. 9 is a flowchart of a method for controlling touch report rate according to various embodiments of the present disclosure.

FIG. 9 is a flowchart of a method for controlling touch report rate according to various embodiments of the present disclosure.

Referring to FIG. 9, the touch control module 230 may receive, from the touch panel 210, a signal indicating a state of each touch sensor in operation 901.

In operation 903, the touch control module 230 may determine whether a previously sensed touch is released based on the signal received from each touch sensor. If the touch is not released, the touch control module 230 may perform operation 905, but, if the touch is released, the touch control module 230 may perform operation 917.

In operation 905, the touch control module 230 may determine whether a valid touch input exists based on the signal received from each touch sensor. If there is a valid touch input, the touch control module 230 may perform operation 907. If there is no valid touch input, the touch control module 230 may return to operation 901.

In operation 907, the touch control module 230 may determine whether a touch sensed by the touch panel 210 corresponds to a starting touch input based on the signal received from each touch sensor. If the valid touch input corresponds to the starting touch input, the touch control module 230 may perform operation 909. If the valid touch input does not correspond to the starting touch input, the touch control module 230 may perform operation 913.

In operation 909, the touch control module 230 may change the rate of transferring the input information into the first rate. The first rate may correspond to a higher transferring rate than the second rate, which is the normal transferring rate.

In operation 911, the touch control module 230 may start a timer. For example, if the starting touch input is sensed, the touch control module 230 may start the timer. For example, until the touch is released after the touch starting input is sensed, the timer may increase an elapsed time.

In operation 913, the touch control module 230 may determine whether the timer arrives at a specified time, i.e., whether the timer expires. The specified time (or a threshold of time) may represent a reference value of an elapsed time from sensing of the starting touch input to determine changing the transferring rate from the first rate into the second rate. The expiration of the timer may indicate that the touch control module 230 is not required to maintain a high transferring rate. The specified time may vary based on an electronic device, a user, an application, or a power use mode.

If the timer expires in operation 913, the touch control module 230 may perform operation 915. If the timer has not expired, the touch control module 230 may perform operation 901.

In operation 915, the touch control module 230 may change the rate of transferring the input information into the second rate. The second rate may correspond to the normal transferring rate.

If the touch that has been maintained since occurrence of the touch is released, the touch control module 230 may reset the timer in operation 917.

If the touch is maintained for the specified time or longer without being released, the touch control module 230 may change the transferring rate into the normal transferring rate to reduce unnecessary power consumption while performing a response to a touch input at an appropriate rate.

Figure 10:
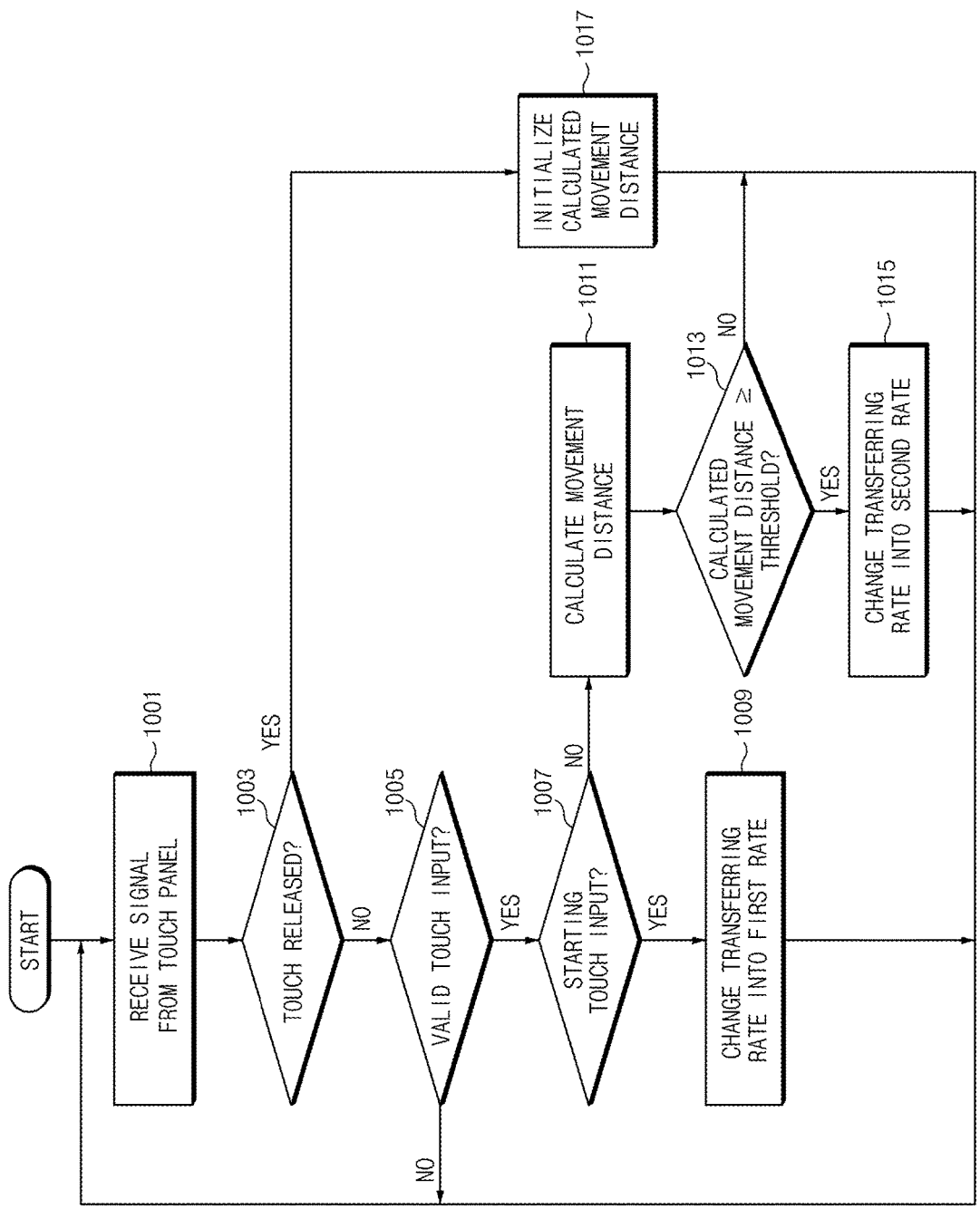
FIG. 10 is a flowchart of a method for controlling touch report rate according to various embodiments of the present disclosure.

FIG. 10 is a flowchart of a method for controlling touch report rate according to various embodiments of the present disclosure.

Referring to FIG. 10, the touch control module 230 may receive, from the touch panel 210, a signal indicating a state of each touch sensor in operation 1001.

In operation 1003, the touch control module 230 may determine whether a previously sensed touch is released based on the signal received from each touch sensor. If the touch is not released, the touch control module 230 may perform operation 1005. If the touch is released, the touch control module 230 may perform operation 1017.

In operation 1005, the touch control module 230 may determine whether a valid touch input exists based on the signal received from each touch sensor. If there is a valid touch input, the touch control module 230 may perform operation 1007. If there is no valid touch input, the touch control module 230 may perform operation 1001.

In operation 1007, the touch control module 230 may determine whether a touch sensed by the touch panel 210 corresponds to a starting touch input based on the signal received from each touch sensor. If the valid touch input corresponds to the starting touch input, the touch control module 230 may perform operation 1009. If the valid touch input does not correspond to the starting touch input, the touch control module 230 may perform operation 1013.

In operation 1009, the touch control module 230 may change the rate of transferring the input information into the first rate. The first rate may correspond to a higher transferring rate than the second rate, which is the normal transferring rate.

In operation 1011, the touch control module 230 may calculate a movement distance of the touch. For example, if the touch is moved without being released, the touch control module 230 may calculate the movement distance from a point where a previous touch input has been sensed to a point where a touch input is sensed thereafter.

After calculating the movement distance, the touch control module 230 may determine whether the calculated movement distance is equal to or larger than a threshold in operation 1013. The threshold may represent a reference value of the movement distance of a touch for changing the transferring rate from the first rate into the second rate. The calculated movement distance which is equal to or larger than the threshold may represent that the touch control module 230 is not required to maintain a high transferring rate. The threshold may vary based on an electronic device, a user, an application, or a power use mode.

If the calculated movement distance is equal to or larger than the threshold in operation 1013, the touch control module 230 may perform operation 1015. If the calculated movement distance is smaller than the threshold, the touch control module 230 may return back to operation 1001.

In operation 1015, the touch control module 230 may change the rate of transferring the input information into the second rate. The second rate may correspond to the normal transferring rate.

If the touch that has been maintained since occurrence of the touch is released, the touch control module 230 may initialize the calculated movement distance in operation 1017.

If the touch is moved by at least a specified distance without being released, the touch control module 230 may change the transferring rate into the normal transferring rate to reduce unnecessary power consumption while performing a response to a touch input at an appropriate rate.

A method for controlling a touch screen according to various embodiments of the present disclosure may include sensing a touch or hovering input by an external object through a touch panel of the touch screen, monitoring the input sensed, transferring the monitored input to a processor at a selected frequency, and dynamically changing the frequency into one selected from among at least two frequencies based on at least a part of the monitored input.

According to various embodiments of the present disclosure, the at least two frequencies may include a first frequency and a second frequency higher than the first frequency, and the changing the frequency may include changing the frequency into one selected from among the first and second frequencies in response to the input.

According to various embodiments of the present disclosure, the changing of the frequency may include changing the frequency into the second frequency if the input corresponds to a starting touch input.

According to various embodiments of the present disclosure, the changing of the frequency may include changing the frequency into the first frequency if the input is released.

According to various embodiments of the present disclosure, the changing of the frequency may include counting the number of times of transferring the input while the input is maintained, and changing the frequency into the first frequency if the counted number of times of transferring the input is larger than a specified threshold.

According to various embodiments of the present disclosure, the changing of the frequency may include calculating a movement distance of the input while the input is maintained, and changing the frequency into the first frequency if the calculated movement distance is larger than a specified threshold.

According to various embodiments of the present disclosure, the changing of the frequency may include changing the frequency into the first frequency if a time elapsed time since occurrence of the input is larger than a threshold while the input is maintained.

According to various embodiments of the present disclosure, the changing of the frequency may include changing the frequency into the second frequency if the touch is moved to a specified area on the touch panel.

According to various embodiments of the present disclosure, the first frequency or the second frequency may be set for each application or each power mode.

According to various embodiments of the present disclosure, the transferring of the monitored input to the processor may not be performed if the touch screen is in a first state.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 120), the processor may perform functions corresponding to the instructions. The computer-readable storage medium may be, for example, the memory 130.

A computer-readable recording medium may include a hard disk, a floppy disk, a magnetic medium (e.g., a magnetic tape), an optical medium (e.g., compact disc-read only memory (CD-ROM), DVD), a magneto-optical medium (e.g., a floptical disk), or a hardware device (e.g., a ROM, a random-access memory (RAM), a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

The module or program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

A method for controlling a touch screen according to various embodiments of the present disclosure may enable reduction of power consumption with improvement of touch responsiveness by dynamically changing a frequency into one selected from among two or more frequencies based on at least a part of a monitored input.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
an application processor; and
a control circuit included in a touch screen, wherein the control circuit is configured to:
detect a single touch input by an external object at a first time and a first location on the touch screen,
if the single touch input corresponds to a starting touch input which includes a touch input performed in an idle state or a touch input performed when there is no history of a previous touch input or a previous touch input is released, transfer input information to the application processor at a touch report rate of a first frequency which is a higher rate than a normal transferring rate,
while the single touch input is maintained and changes location on the touch screen, monitor the single touch input based on the touch report rate,
change the touch report rate from the first frequency to a second frequency, which is the normal transferring rate if a counted number of times of transferring the input information becomes equal to or larger than a threshold and the touch is not released, or if a measured elapsed time becomes equal to or larger than a threshold while the touch is maintained, or if an obtained movement distance of the touch becomes equal to or larger than a threshold while the touch is maintained, if a touch input is positioned on a specified area which is a partial area of an edge of a touch panel or an area for which sufficient touch performance is not ensured by the second frequency, change the touch report rate to the first frequency, and when the single touch input is released at a second location on the touch screen that is different than the first location, change the touch report rate to the second frequency.

2. The electronic device of claim 1, wherein the first frequency or the second frequency is set for each application or each power mode.

3. The electronic device of claim 1, wherein, when the touch screen is in a first state, the control circuit is further configured to omit transferring information related to the single touch input to the application processor.

4. A method for controlling a control circuit included in a touch screen, the method comprising:

detecting a single touch input by an external object at a first time and a first location on the touch screen;

if the single touch input corresponds to a starting touch input which includes a touch input performed in an idle state or a touch input performed when there is no history of a previous touch input or a previous touch input is released, transferring input information to an application processor at a touch report rate of a first frequency which is a higher rate than a normal transferring rate;

while the single touch input is maintained and changes location on the touch screen, monitoring the touch input based on the touch report rate;

changing the touch report rate from the first frequency to a second frequency, which is the normal transferring rate if a counted number of times of transferring the input information becomes equal to or larger than a threshold and the touch is not released, or if a measured elapsed time becomes equal to or larger than a threshold while the touch is maintained, or if an obtained movement distance of the touch becomes equal to or larger than a threshold while the touch is maintained;

if a touch input is positioned on a specified area which is a partial area of an edge of a touch panel or an area for which sufficient touch performance is not ensured by the second frequency, changing the touch report rate to the first frequency; and when the single touch input is released at a second location on the touch screen that is different than the first location, changing the touch report rate to the second frequency.

5. The method of claim 4, further comprising reporting of the information of the single touch input to the application processor at the touch report rate, if the touch screen is not in a first state.

6. The method of claim 4, wherein the first frequency or the second frequency is set for each application or each power mode.

* * * * *